United States Patent [19]

Stange

[11] 4,192,704

[45] Mar. 11, 1980

[54] EXPANDABLE MUFF MOULD

[76] Inventor: Ingvar Stange, 3880 Dalen, Telemark, Norway

[21] Appl. No.: 890,217

[22] Filed: Mar. 27, 1978

[30] Foreign Application Priority Data

Apr. 18, 1977 [NO] Norway ............................... 771336

[51] Int. Cl.² .............................................. B65C 1/00
[52] U.S. Cl. ...................................... 156/443; 242/1; 249/179
[58] Field of Search ............... 156/443; 249/179, 180, 249/90, 183; 242/1; 81/363, 1 K, 3.7; 74/38

[56] References Cited

U.S. PATENT DOCUMENTS

| | | | |
|---|---|---|---|
| 1,560,931 | 11/1925 | Easterday | 249/90 X |
| 2,699,698 | 1/1955 | Adams | 81/363 X |
| 2,747,249 | 5/1956 | Chiverton | 249/179 X |
| 3,570,802 | 3/1971 | Miller | 249/179 |
| 3,656,732 | 4/1972 | St. John | 249/179 |
| 3,815,864 | 6/1974 | Loeber | 249/183 X |

Primary Examiner—David A. Simmons
Attorney, Agent, or Firm—Watson, Cole, Grindle & Watson

[57] ABSTRACT

An expandable muff mould comprising an annular elastic metal member, which is provided with an axial slot, and a wedge means adapted to be detachably affixed in the slot, the muff mould expanding to a larger inner diameter with the wedge means inserted in slot than with the wedge means removed therefrom. The wedge means is attached to the inner side of the muff mould by a link mechanism which can be moved from a first position in which the wedge means is retracted from the slot and to a second self-blocking position in which the wedge means is locked in the slot by use of a suitable tool.

3 Claims, 4 Drawing Figures

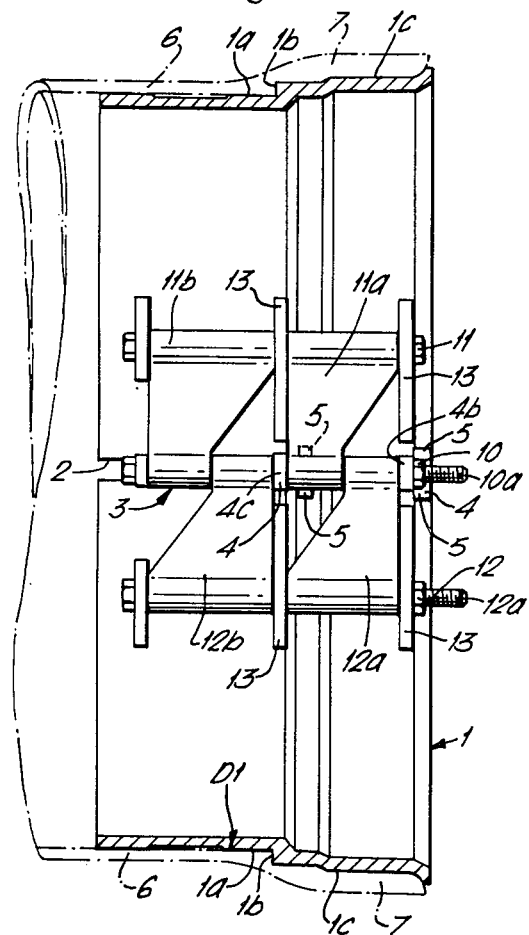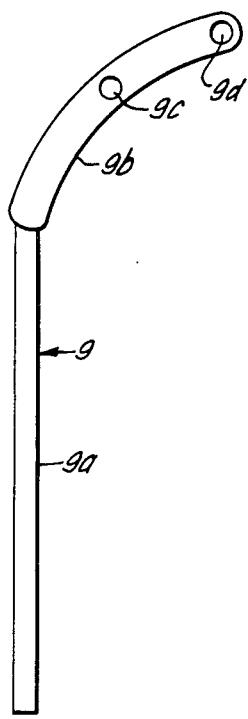

4,192,704

EXPANDABLE MUFF MOULD

BACKGROUND OF THE INVENTION

1. Field of the Invention

The present invention relates to an improved expandable muff mould comprising an annular elastic metal member which is provided with an axial slot and a wedge means adapted to be detachably affixed in the slot, the muff mould expanding to a larger inner diameter with the wedge means inserted in the slot than with the wedge means removed therefrom.

The muff mould according to the invention finds particular application in connection with the forming of a cylindrical socket portion on a plastic pipe, the socket being formed by winding a web soaked in curable plastic material around the end portion of the pipe and the mould which has been inserted therewithin.

2. Statement of the Prior Art

In German DE-OS 23 44 715 there is disclosed a ring-shaped core used for the production of a cylindrical socket or transition portions on moulded plastic articles. The ring-shaped core is made from a single elastic blank and is provided with an axial slot. A sealing element can be inserted into the slot, the size of the element determining the degree of expansion of the core. According to this German Auslegeschrift, the core is made from steel and the sealing element from rubber. Further, this publication suggests the holding of the element in the core slot by screw connections.

The handling of this core when preparing it for a moulding operation is both cumbersome and time-consuming, and the rubber sealing element is apt to yield when a web soaked in a curable plastic is wound around the core, the yielding of the rubber element sacrificing the accuracy of the finished plastic product.

From U.S. Pat. No. 2,105,047 there is known a stretcher for uniform cap covers comprising two segmental shells of nearly semi-circular shape. The two shells are kept together by two intermediate link mechanisms each of which is formed from stiff wire bent to a suitable shape to effect a separation of the two shells and consequent effective stretching of a cap cover engaged on the shells.

A stretcher like this is not suitable for the field of application contemplated in connection with the present invention, the known stretcher not being made from a single elastic blank nor having a wedge means which in locked position is flush with the outer surface of the mould.

SUMMARY OF THE INVENTION

The object of the invention is to provide a muff mould which is of a rugged but simple construction, which is easy to insert into a pipe end and be expanded therein, which retains its expanded shape during the moulding operation, and which forms an unbroken extension of the pipe end to be provided with a socket portion.

In a muff mould of the type specified in the preamble, the improvement relates to the fact that the wedge means is attached to the inner side of the muff mould by a link mechanism which, by use of a suitable tool, can be moved from a first position in which the wedge means is retracted from the slot to a second self-blocking position in which the wedge means is locked in the slot.

Preferably the wedge means is provided with stop studs which in the locked position of the wedge means abut against the inner muff wall, the free end surface of the wedge being flush with the outer surface of the muff mould.

In a preferred embodiment of the invention the wedge means takes the form of a U-shaped member, the legs of which are provided with holes through which a first bolt extends, a pair of upper and lower link arms being mounted on the bolt for pivotable connection with brackets attached to the inner wall of the muff mould.

A tool to be used in conection with an expandable muff mould as defined above may take the form of a rod-shaped holding member having a slightly bent end portion provided with two holes, the first hole matching with a protruding end portion of the first bolt and the second hole matching with a protruding end portion of a second bolt which serves as a pivotable connection between one of the link arms and the associated bracket.

In the following the invention will be further described, reference being had to the drawings which illustrates a preferred embodiment of the invention.

BRIEF DESCRIPTION OF THE DRAWINGS

FIG. 3 shows a section taken along the line III—III in FIG. 1.

FIG. 4 is a view of a tool used in connection with the muff according to the invention.

DESCRIPTION OF THE PREFERRED EMBODIMENT

Figure 1:
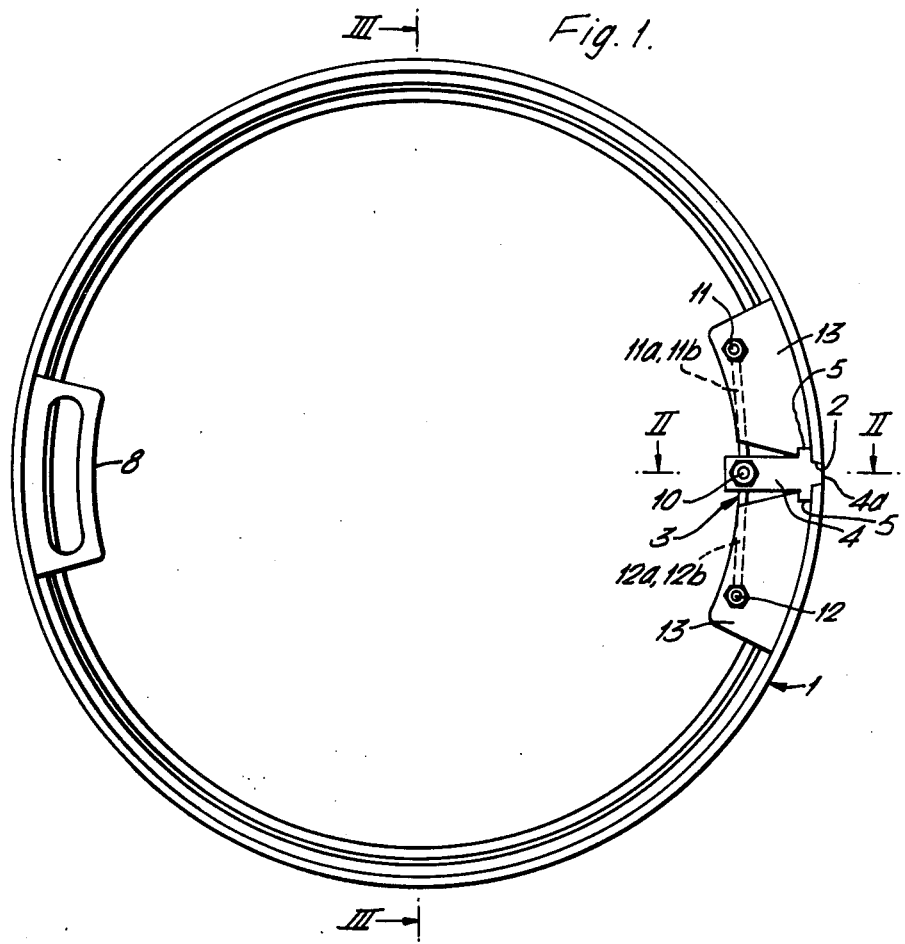
FIG. 1 is an end view of an embodiment of the expandable muff mould according to the invention.
Figure 2:
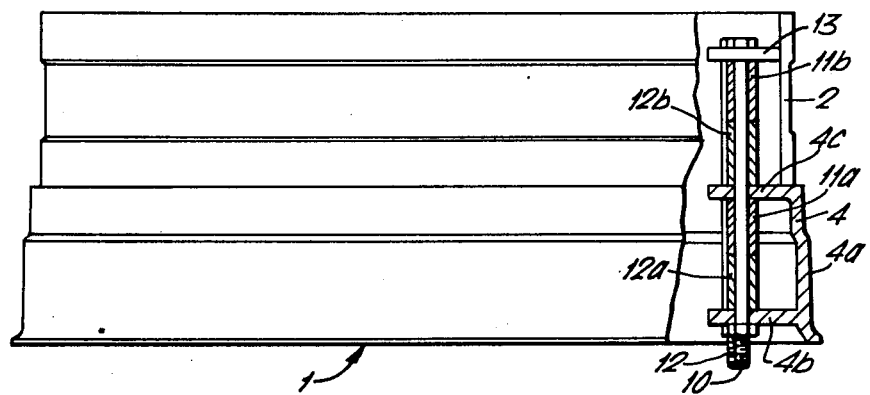
FIG. 2 is a plan view, partly in section, taken along the line II—II in FIG. 1.

In the drawings the muff mould according to the invention is generally designated by 1 and consists of a ring-shaped metal member provided with an axial slot 2. By means of a self-blocking locking mechanism which is generally designated by 3, and which will be described in detail below, a wedge 4 can be inserted into the slot 2 for thereby resiliently expanding the muff mould 1.

The wedge 4 is provided with stop studs 5 which in the locked position of the wedge abut against the inner muff wall, the free end surface 4a of the wedge being flush with the outer surface of the muff mould.

The muff mould 1 comprises a first portion 1a, the outer diameter D1 of which matches the inner diameter of an already manufactured pipe 6 of curable reinforced plastic when the muff mould 1 is expanded, i.e. when the wedge 4 is inserted in the slot 2. The muff mould is expanded after it has been inserted in the pipe 6 sufficiently that the pipe covers the portion 1a of the muff mould 1 and the pipe edge abuts against a shoulder portion 1b of the mould. Thereafter, a web soaked in curable plastic is wound to a suitable thickness around the remaining portion 1c of the muff mould which has a larger diameter than the portion 1a, and a portion of the pipe end 6 in order to form a pipe socket portion 7. Subsequent to the winding operation and the curing of the muff portion 7, the wedge 4 is retracted from the slot 2 by a key 9 which is shown in detail in FIG. 4, the muff mould 1 then regaining its original smaller diameter due to the inherent stresses in the muff material. Thereafter, the muff mould 1 can be pulled out of the pipe muff portion 7 and prepared for another working operation.

In the continuous production of pipes of cureable reinforced plastic which are to be provided with a socket end portion the cured pipes may be cut at suitable locations in the production line. At the place of cutting, the muff mould is then inserted in the pipe end in which it is expanded to its largest diameter and is covered with plastic-soaked web, as discussed above.

To facilitate the handling of the muff mould 1 the muff mold is provided with a handle 8 which together with the locking mechanism serve as carrying means for the muff mould.

As mentioned above the wedge 4 has a free end surface 4a which is flush with the outer profile of the muff mould. The extension of the wedge corresponds to the width of the portion 1c of the mould, i.e. the portion protruding beyond the pipe end 6 onto which the socket portion 7 is to be moulded. Besides, the wedge 4 takes the form of a U-shaped member, the legs 4b and 4c of which are provided with holes through which a first bolt 10 extends. A couple of upper and lower pivot members 11a, 11b and 12a, 12b, respectively, are attached to the bolt 10. The pivot members in turn are also attached to other bolts 11 and 12, respectively, which are supported by brackets 13 attached to the inner wall of the muff mould 1. The key 9 is made with a rod-shaped gripping portion 9a and a slightly curved end portion 9b which is provided with two holes 9c and 9d, said these holes matching protruding end portions 10a and 12a of the bolts 10 and 12, respectively.

Due to its undivided construction which comprises a locking mechanism, the muff mould according to the invention can be mounted in a very simple manner on site. The setting up and the release of the muff mould in the pipe end to be provided with a socket portion is very easily accomplished with the tool 9, and if a balanced locking mechanism is provided, only a small force on the tool 9 is required to accomplish the necessary displacement of the wedge 4.

What I claim is:

1. In an expandable muff mold for making pipe muff portions, said expandable muff mold including an annular elastic metal member having an axial slot and including a wedge means attached to the inside of said metal member so as to be movable from a position remote from said slot to a position within said slot, the diameter of said annular elastic metal member increasing when said wedge means is positioned within said slot, the improvement wherein said wedge means comprises a generally U-shaped member which includes a bottom portion which is positionable within said slot and two leg portions, said two leg portions including axially aligned holes therein, a first bolt means which extends through said axially aligned holes in said two leg portions of said generally U-shaped member, two pairs of spaced-apart brackets mounted on the inside of said annular elastic metal member, each of said pairs of brackets having aligned holes therein, second and third bolt means respectively mounted to extend through the aligned holes in said pairs of brackets, first and second link arms mounted on said first bolt means and to said second and third bolt means, respectively, so as to be pivotable with respect thereto, and a single detachable tool capable of connection with said first bolt means and one of said second and third bolt means such that said first bolt means and thus said wedge means can be moved from a first position remote from said slot to a self-blocking second position in said slot where said wedge means is locked in position.

2. A muff mold as defined in claim 1 wherein the bottom portion of said generally U-shaped member is generally t-shaped in cross-section with a cross portion and an extension portion, the cross portion acting as stop studs and the free end portion being of such a length that when said wedge means is in said second position, said stop studs will abut against the inner wall of said annular elastic metal member and the free end of the extension portion will be flush with the outer wall of said annular elastic metal member.

3. A muff mold as defined in claim 1 wherein said single detachable tool comprises a rod-shaped holding member and a bent end portion, said bent end portion including two spaced-apart holes, a first of said holes being capable of containing therein an end portion of said first bolt means and the second of said holes being capable of containing therein an end portion of one of said second and third bolt means, such that said tool can move one of said second and third bolt means with respect to said first bolt means via pivoting of said first and second link arms.

* * * * *